C. P. ASTROM.
TILTING MECHANISM FOR CARS.
APPLICATION FILED OCT. 26, 1915.

1,266,193.

Patented May 14, 1918.

INVENTOR
Carl P. Astrom
BY
Edwards, Sager & Wooster
ATTORNEYS.

UNITED STATES PATENT OFFICE.

CARL P. ASTROM, OF EAST ORANGE, NEW JERSEY, ASSIGNOR TO M. H. TREADWELL COMPANY, A CORPORATION OF NEW YORK.

TILTING MECHANISM FOR CARS.

1,266,193.  Specification of Letters Patent.  Patented May 14, 1918.

Application filed October 26, 1915. Serial No. 57,922.

*To all whom it may concern:*

Be it known that I, CARL P. ASTROM, a citizen of the United States, residing at East Orange, in the county of Essex and State of New Jersey, have invented certain new and useful Improvements in Tilting Mechanism for Cars, of which the following is a full, clear, and exact specification.

This invention relates to tilting mechanism for cars, and has particular reference to the provision of means whereby a bucket, wheeled car or truck, such as used in shops for carrying rubbish, etc., may, when loaded, be picked up and transported to a dumping point, and then readily dumped.

As shown herein, the invention is applied to a car comprising a body provided with wheels by which it may be moved from place to place, together with trunnions to which a sling of novel construction may be attached, so that the car can be picked up and moved to a dumping point and then readily dumped while still supported by the sling, the trunnions and sling being so related to each other that the loaded car can be moved without liability of accidental discharge, but easily discharged when desired.

Figure 1:
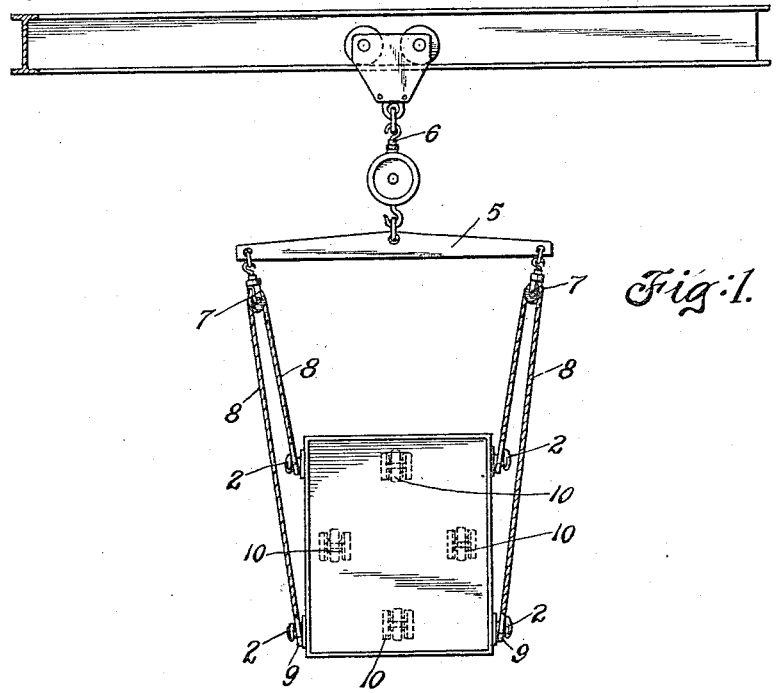
Figure 2:
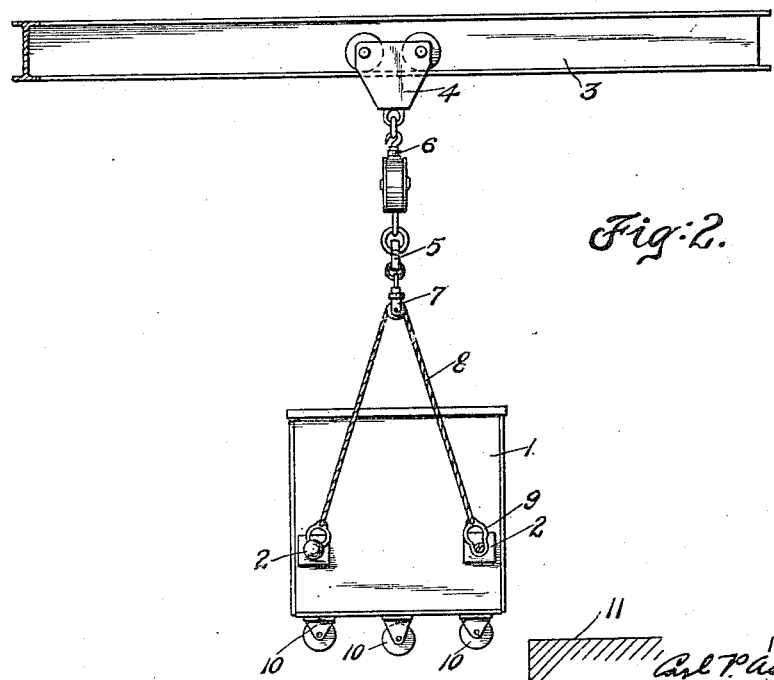

In the accompanying drawing,

Figure 1 is an elevation showing the car partially dumped through ninety degrees, and Fig. 2 is another elevation showing the car in upright position.

1 represents a car body of any desired shape and depth, having trunnions 2, 2, on opposite sides and located slightly above the center of gravity of the car when loaded. 3 represents an overhead support carrying a traveler 4, from which is suspended a beam 5 by a swivel 6. The beam 5 is of greater length than the width of the car body 1 between the trunnions 2, and at each end of the beam is a swivel pulley 7. Arranged to run over each pulley 7 and be hooked at its ends to trunnions 2 on each side is a flexible member or chain 8. The car carries wheels 10 which ordinarily run on the floor 11 when the car is being loaded. When the car is to be dumped, the hooks 9 on each chain 8 are hooked on the trunnions 2, then the car is pushed along until it clears the floor 11 and becomes suspended by chains 8.

Owing to the trunnions 2 being slightly above the center of gravity of the loaded car, it will be seen that the car is suspended in stable equilibrium. When the car reaches the dumping point, it is simply necessary for the operator to lift one side of the car body 1, or depress the other side, so that the chains 8 run over the pulleys 7 until the car is bottom upward, when the trunnions 2 become horizontally opposite each other. This is permitted by reason of having the pulleys 7 located farther apart than the width of the body between trunnions 2, so that the trunnions which move up can clear the length of chain running to the lower trunnions, and at the same time the pulleys 7 swivel with the chain through practically ninety degrees. The swivel 6 is provided to enable the whole car body to be swung around so as to be dumped at any desired angle relatively to the overhead support 3. When the body has been dumped, it can be easily swung back to upright position, and remains there in stable equilibrium owing to the location of the trunnions before described, since the trunnions are also slightly above the center of gravity of the empty body.

The invention is applicable to various forms of bodies and buckets, as well as wheeled cars, and various modifications and changes in the preferred form of construction shown herein may be made without departing from the scope of the appended claim.

Having thus described my invention, I declare that what I claim as new and desire to secure by Letters Patent, is:—

The combination with a body having a pair of horizontally separated trunnions on each side, of a suspended beam carrying at each end swiveled flexible member supports separated at a greater distance than the width of said body, and flexible members traveling over said supports and connected at their ends to said trunnions.

In testimony whereof I affix my signature, in presence of two witnesses.

CARL P. ASTROM.

Witnesses:
  ERIC ROLAND,
  J. S. WOOSTER.

Copies of this patent may be obtained for five cents each, by addressing the "Commissioner of Patents, Washington, D. C."